United States Patent
Ma et al.

(10) Patent No.: US 11,107,229 B2
(45) Date of Patent: Aug. 31, 2021

(54) IMAGE PROCESSING METHOD AND APPARATUS

(71) Applicant: Samsung Electronics Co., Ltd., Suwon-si (KR)

(72) Inventors: Lin Ma, Beijing (CN); Wonhee Lee, Yongin-si (KR); Chun Wang, Beijing (CN); Guangwei Wang, Beijing (CN); Minsu Ahn, Yongin-si (KR); Tianhao Gao, Beijing (CN); Sung Hoon Hong, Suwon-si (KR); Zhihua Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 16/237,952

(22) Filed: Jan. 2, 2019

(65) Prior Publication Data
US 2019/0213747 A1    Jul. 11, 2019

(30) Foreign Application Priority Data

Jan. 10, 2018  (CN) .......................... 201810024743.0
Aug. 3, 2018   (KR) .......................... 10-2018-0090827

(51) Int. Cl.
| G06K 9/00  | (2006.01) |
| G06T 7/55  | (2017.01) |
| G06T 7/70  | (2017.01) |
| G06T 7/60  | (2017.01) |
| G06K 9/62  | (2006.01) |
| G06T 7/11  | (2017.01) |

(52) U.S. Cl.
CPC .............. *G06T 7/55* (2017.01); *G06K 9/6267* (2013.01); *G06K 9/6292* (2013.01); *G06T 7/11* (2017.01); *G06T 7/60* (2013.01); *G06T 7/70* (2017.01); *G06T 2207/20076* (2013.01); *G06T 2207/20081* (2013.01); *G06T 2207/20084* (2013.01); *G06T 2207/20216* (2013.01)

(58) Field of Classification Search
CPC ............... G06K 9/6267; G06K 9/6292; G06T 2207/20076; G06T 2207/20081; G06T 2207/20084; G06T 2207/20216; G06T 7/11; G06T 7/536; G06T 7/55; G06T 7/60; G06T 7/70
See application file for complete search history.

(56) References Cited

U.S. PATENT DOCUMENTS

| 9,205,835 | B2 | 12/2015 | Stein et al. |
| 9,505,346 | B1 | 11/2016 | Yamada |
| 9,582,867 | B2 | 2/2017 | Suhr et al. |
| 9,646,497 | B1 | 5/2017 | Chatham |
| 2005/0129306 | A1 | 6/2005 | Wang et al. |
| 2013/0138436 | A1 | 5/2013 | Yu et al. |
| 2015/0003670 | A1 | 1/2015 | Kuehnle |
| 2015/0139534 | A1* | 5/2015 | Komatsu ................ G06T 7/536 382/154 |
| 2015/0254531 | A1 | 9/2015 | C.R. et al. |
| 2016/0026880 | A1 | 1/2016 | Lee et al. |
| 2017/0024644 | A1 | 1/2017 | Van Der Made et al. |

(Continued)

*Primary Examiner* — Xin Jia
(74) *Attorney, Agent, or Firm* — NSIP Law

(57) ABSTRACT

An image processing method and apparatus is disclosed. The image processing method includes receiving an input image and estimating a depth of a target based on a position, a size, and a class of the target in the input image.

18 Claims, 8 Drawing Sheets

(56) References Cited

U.S. PATENT DOCUMENTS

| | | |
|---|---|---|
| 2017/0032222 A1 | 2/2017 | Sharma et al. |
| 2017/0169315 A1 | 6/2017 | Vaca Castano et al. |
| 2017/0220904 A1 | 8/2017 | Bai et al. |
| 2017/0249504 A1* | 8/2017 | Martinson ........... G06K 9/00771 |
| 2017/0251081 A1 | 8/2017 | Roychowdhury et al. |
| 2018/0096610 A1* | 4/2018 | Ray ..................... G06K 9/6212 |

* cited by examiner

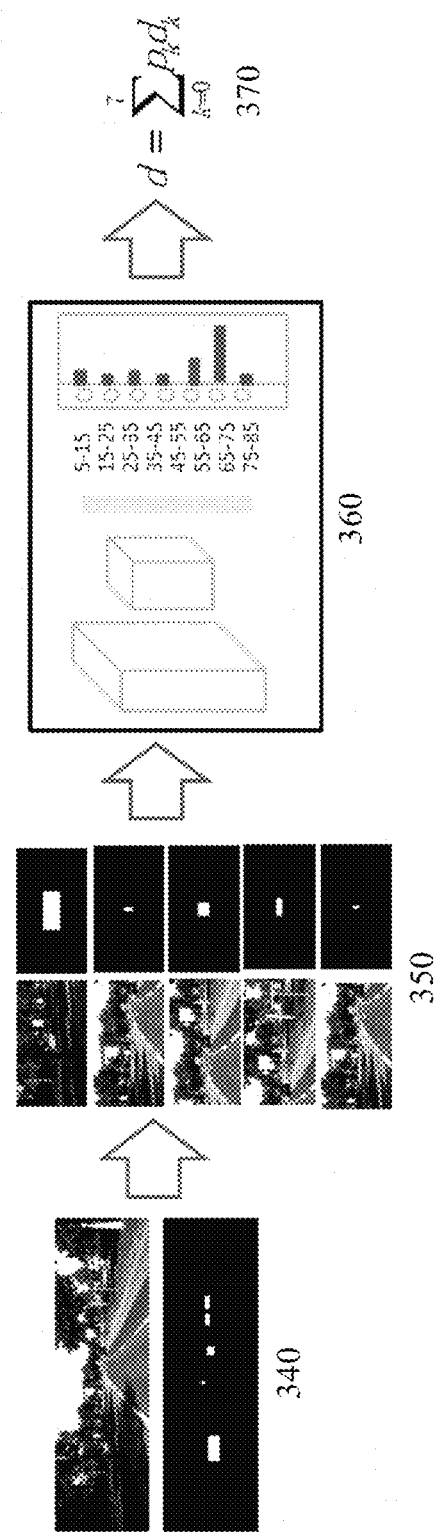

400

IMAGE PROCESSING METHOD AND APPARATUS

CROSS-REFERENCE TO RELATED APPLICATIONS

This application claims the benefit under 35 USC § 119(a) of Chinese Patent Application No. 201810024743.0 filed on Jan. 10, 2018, in the State Intellectual Property Office of the P.R.C. and Korean Patent Application No. 10-2018-0090827 filed on Aug. 3, 2018, in the Korean Intellectual Property Office, the entire disclosures of which are incorporated herein by reference for all purposes.

BACKGROUND

1. Field

The following description relates to an image processing method and apparatus.

2. Description of Related Art

Depth estimation is applied to various situations to estimate a depth of a target in an image, for example, depth estimation is applied in automated and assisted driving. Existing depth estimation methods include methods such as stereoscopic vision-based method, laser ranging method, and target size-based method. The existing depth estimation method may be broadly divided into two types: o a method of obtaining a depth from a hardware device such as a Velodyne light detection and ranging (LiDAR) device, and a method of obtaining a depth from a low-cost vision sensor.

Using the former type of method a depth may be estimated with high accuracy. However, a device used may be large in volume and costly. In addition, the method may obtain a relatively low number of depth images with a relatively low resolution. Using the latter type of method may obtain a depth from two vision sensors. However, when a target is positioned relatively far away from the sensors, a line of sight may be almost parallel and a relatively less accurate depth may be obtained.

In addition, there is a gradually increasing use of a method of capturing a monocular image using a single vision sensor, for example, a camera, and estimating a depth of the monocular image through deep learning. However, such a method may be considerably dependent on training data, require huge computational resources, and have low accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method including receiving an input image, and estimating a depth of a target based on a position, a size, and a class of the target in the input image.

The estimating may include estimating the depth of the target through single-task learning of a single-task network, in response to the position, the size, and the class of the target being known, and estimating the depth of the target through multi-task learning of a multi-task network, in response to the position, the size, and the class of the target not being known.

The image processing method may include preprocessing the input image before estimating the depth of the target.

The preprocessing may include normalizing the input image based on focal length information of the input image and standard focal length information.

The estimating of the depth of the target through the single-task learning may include cropping an image block around the target from the input image, and masking the image block to obtain a mask image of a size that is similar to a size of the image block, splicing the image block and the mask image for each channel, inputting, to the single-task network, a spliced image obtained through the splicing, and outputting the depth of the target from the single-task network.

The outputting of the depth of the target from the single-task network may include determining a probability that the depth of the target corresponds to each depth interval, obtaining a final depth of the target by assigning a weighted value to the probability of the each depth interval, and outputting the final depth of the target.

The estimating of the depth of the target through the multi-task learning may include determining the position and the size of the target through target detection branch processing, determining the class of the target through target classification branch processing based on the position and the size of the target, and determining the depth of the target through target depth estimation branch processing based on the position, the size, and the class of the target.

The multi-task network may be a network based on a feature of a region-based convolutional neural network (R-CNN), wherein a loss function of the multi-task network may be obtained by adding depth loss information to a loss function of the R-CNN.

The multi-task network may be a network based on a second version of You Only Look Once (YOLO2), wherein a loss function of the multi-task network may be obtained by adding depth loss information to a loss function of the YOLO2.

The determining of the depth of the target through the target depth estimation branch processing may include determining a probability that the depth of the target corresponds to each depth interval, and obtaining a final depth of the target by assigning a weighted value to the respective probability for the each depth interval.

In another general aspect, there is provided an image processing apparatus including a processor configured to receive an input image, and estimate a depth of a target based on a position, a size, and a class of the target in the input image.

The image processing apparatus of claim 12, wherein the processor may be configured to estimate the depth of the target through single-task learning of a single-task network, in response to the position, the size, and the class of the target being known, and estimate the depth of the target through multi-task learning of a multi-task network, in response to the position, the size, and the class of the target not being known.

The processor may be configured to preprocess the input image before estimating the depth of the target.

The processor may be configured to normalize the input image based on focal length information of the input image and standard focal length information.

The processor may be configured to crop an image block around the target from the input image, mask the image block to obtain a mask image of a size that is similar to a size of the image block, splice the image block and the mask image for each channel, input, to the single-task network, a spliced image obtained through the splicing, and output the depth of the target from the single-task network.

The processor may be configured to determine a probability that the depth of the target corresponds to each depth interval, obtain a final depth of the target by assigning a weighted value to the probability of the each depth interval, and output the final depth of the target.

The processor may be configured to determine the position and the size of the target through target detection branch processing, determine the class of the target through target classification branch processing based on the position and the size of the target, and determine the depth of the target through target depth estimation branch processing based on the position, the size, and the class of the target.

The multi-task network may be a network based on a feature of a region-based convolutional neural network (R-CNN), wherein a loss function of the multi-task network may be obtained by adding depth loss information to a loss function of the R-CNN.

The multi-task network may be a network based on a second version of You Only Look Once (YOLO2), wherein a loss function of the multi-task network may be obtained by adding depth loss information to a loss function of the YOLO2.

The processor may be configured to determine a probability that the depth of the target corresponds to each depth interval, and obtain a final depth of the target by assigning a weighted value of the respective probability for the each depth interval.

Other features and aspects will be apparent from the following detailed description, the drawings, and the claims.

BRIEF DESCRIPTION OF THE DRAWINGS

FIG. 3B is a diagram illustrating an example of the target depth estimation method of FIG. 3A.

Figure 1:
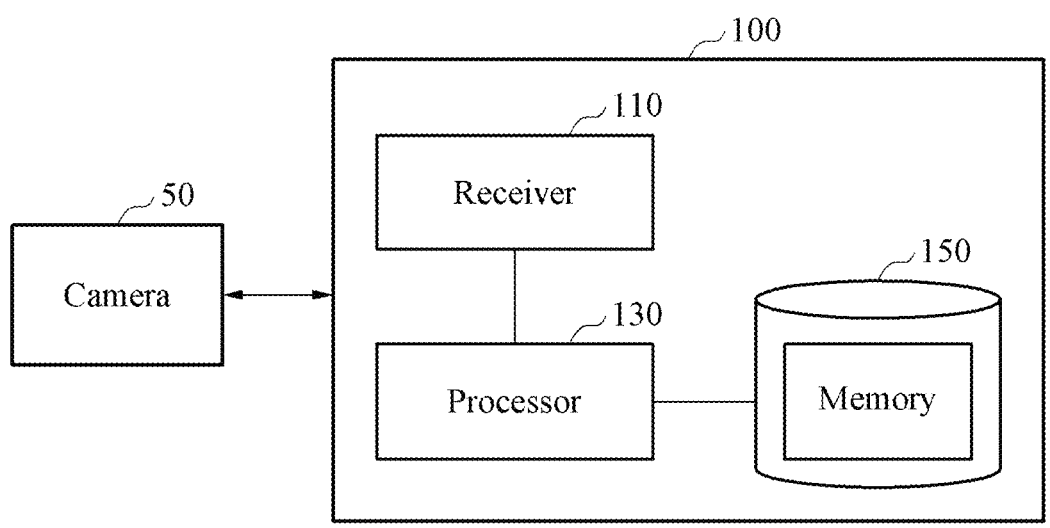
FIG. 1 is a diagram illustrating an example of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
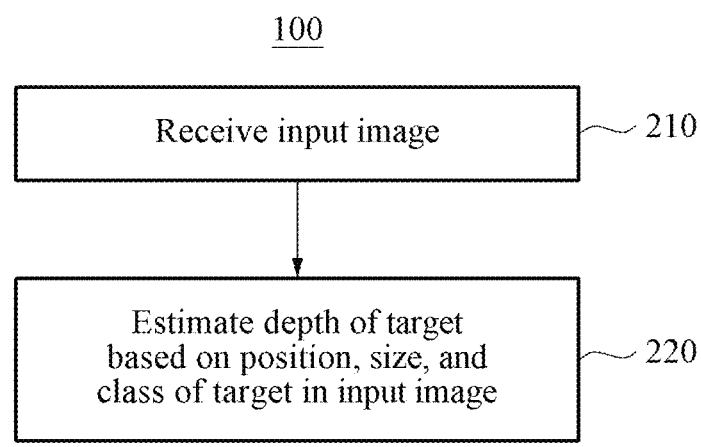
FIG. 2 is a diagram illustrating an example of an image processing method.

FIG. 1 is a diagram illustrating an example of an image processing device. FIG. 2 is a diagram illustrating an example of an image processing method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIGS. 1 and 2, an image processing device 10 includes a camera 50 and an image processing apparatus 100. The image processing device 10 may be used to interpret visual information and assist safe and pleasant driving in a device including an intelligent system such as a head-up display (HUD) installed for driving assistance or fully autonomous driving of a vehicle. The image processing device 10 may be used for automated and/or assisted driving technology. The image processing device 10 may assist steering of an autonomous vehicle in an augmented reality (AR) navigation system of a smart vehicle. In addition, the image processing device 10 may be used for an augmented reality head-up display (AR HUD). The examples may be applied to, for example, an autonomous vehicle, an intelligent vehicle, a smart phone, wearable device, various Internet of Things (IoT) device, security device, robot requiring a positioning operation, and a mobile device.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

The image processing device 10 may estimate a depth of a target using a monocular image based on a characteristic that an object appears larger when it is positioned nearby and appears smaller when it is positioned far away in images with a same focal length. The depth may indicate, for example, a distance.

The camera 50 may obtain an input image. For example, the camera 50 may be a single-vision sensor, and the input image may be a monocular image. Although the camera 50 is illustrated in FIG. 1 as being positioned outside the image processing apparatus 100, the camera 50 may also be included in the image processing apparatus 100 according to examples.

The image processing apparatus 100 may estimate a depth of at least one target included in the input image based on the input image. For example, the target may be an object in the input image.

In an example, the image processing apparatus 100 includes a receiver 110, a processor 130, and a memory 150 configured to store an instruction.

Referring to FIG. 2, in operation 210, the receiver 110 receives an input image. When an instruction is executed by the processor 130, the processor 130 performs an operation to estimate a depth of a target. In operation 220, the processor 130 estimates a depth of a target based on a position, a size, and a class of the target in the input image.

Herein, a class of a target, which is also referred to as a label of a target, may be an object included in an image, such as, for example, a human being, a vehicle, a traffic signal, or a traffic sign. A position of a target may be coordinates of the target in an image. A size of a target may be a size of a detection frame surrounding the target, and the detection frame may be indicated as a rectangular frame in an example.

When the position, the size, and the class of the target are known, the processor 130 estimates a depth of the target through single-task learning of a single-task network. The signal-task learning may indicate learning through a network including a single task including, for example, depth estimation. Further details on estimating a depth of a target through the single-task learning will be described with reference to FIG. 3.

When the position, the size, and the class of the target are not known, the processor 130 estimates a depth of the target through multi-task learning of a multi-task network. The multi-task learning may indicate learning through a network including a plurality of tasks including, for example, target detection, target identification, and depth estimation. Further details on estimating a depth of a target through the multi-task learning will be described with reference to FIG. 4.

In an example, the processor 130 preprocesses the input image before estimating a depth of the target. In an example, the preprocessing may include normalizing the input image based on focal length information of the input image and standard focal length information.

For example, input images may be obtained from different focal lengths by different cameras and a same target may have different sizes due to the different focal lengths in the input images, and thus an estimated depth of the target may vary. For example, when a standard focal length $f_0$ is given, one image with a width w, a height h, and a focal length f may be normalized to have a width $$w' = \frac{f_0 w}{f}$$

and a height $$h' = \frac{f_0 h}{f},$$

respectively. Herein, w' and h' indicate a width and a height of the image after the normalization. Each pixel may be obtained through interpolation based on a ratio of w and w', or a ratio of h and h'. That is, an image may be normalized with a same focal length through the preprocessing.

As described above, the image processing apparatus 100 may estimate a depth of a target in an image with high accuracy using the single camera 50. Compared to an existing monocular depth estimation method, a target depth estimation method described herein may reduce an error by an approximate factor of 1.4. For example, a result of an experiment showed that a root-mean-square error (RMSE) is reduced from at least 4.1 m to approximately 2.9 m.

That is, the target depth estimation method may reduce costs and increase accuracy in estimation.

Figure 3A:
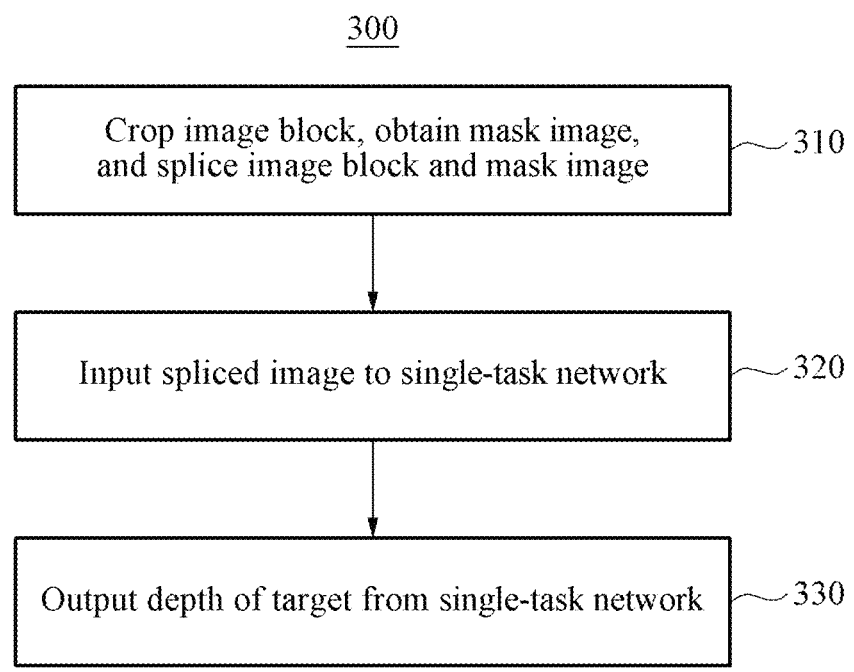
FIG. 3A is a diagram illustrating an example of a target depth estimation method.

FIG. 3A is a diagram illustrating an example of a target depth estimation method 300. The operations in FIG. 3A may be performed in the sequence and manner as shown, although the order of some operations may be changed or some of the operations omitted without departing from the spirit and scope of the illustrative examples described. Many of the operations shown in FIG. 3A may be performed in parallel or concurrently. One or more blocks of FIG. 3A, and combinations of the blocks, can be implemented by special purpose hardware-based computer that perform the specified functions, or combinations of special purpose hardware and computer instructions. In addition to the description of FIG. 3A below, the descriptions of FIGS. 1-2 are also applicable to FIG. 3A, and are incorporated herein by reference. Thus, the above description may not be repeated here.

Referring to FIG. 3A, when a position, a size, and a class of a target in an input image are known, the processor 130 estimates a depth of the target through single-task learning of a single-task network.

In operation 310, when the position, the size, and the class of the target in the input image is known, the processor 130 crops an image block along a periphery of the target from the input image and masks the image block to obtain a mask image, and splices the image block and the mask image for each channel. For example, the image block may be of a preset size. In addition, the mask image may be of a size the same as that of the image block. The processor 130 may perform the operations described above on each of targets included in the input image.

In operation 320, the processor 130 inputs a spliced image obtained through the splicing to the single-task network. The spliced image may be a single image in which the image block and the mask image are spliced together based on a channel.

In operation 330, the processor 130 outputs a depth of the target from the single-task network.

FIG. 3B is a diagram illustrating an example of the target depth estimation method 300 of FIG. 3A.

FIG. 3B illustrates an example of the target depth estimation method 300 used when a state of a target is already known.

In a field of automated and assisted driving, a KITTI dataset, which is developed by Karlsruhe Institute of Technology (KIT) and Toyota Technological Institute at Chicago (TTIC), may be used to apply calculation methods, for example, vehicle detection, vehicle tracking, semantic segmentation, and the like, in traffic conditions.

For the KITTI dataset, all pieces of depth data may be obtained through light detection and ranging (LiDAR) scanning. Through an analysis, a depth detection range may be approximately 5 m to 85 m. This range may be divided into eight intervals corresponding to eight classes. For example, (5, 15) may be classified as a zeroth class, and (15, 25) as a first class.

Through such a method, target depth estimation may be changed to target classification. The intervals may be classified through unequal classification. For example, short-range intervals such as (5, 7), (8, 11), (11, 15), and (16, 23) may be classified with a slightly high density, and long-range intervals may be classified with a less density. A detailed range of intervals may be classified based on a distribution of training samples.

In operation 340, a size of an image normalized by the KITTI dataset is 1242×375 pixels. Hereinafter, a unit "pixel" will be omitted for convenience of description.

In operation 350, the processor 130 crops an image block based on a target region and obtains a mask image of a size the same as that of the image block. For example, the image block may be a red, green, blue (RGB) image of 321×181, and the mask image may be a binary mask image of 321×181.

Herein, the size 321×181 of the image block is based on a size of the target region. In an example, a size of a target may be 100×60 and it may be possible to identify the target, or an object, using background information when a ratio of the target region and a background region is 1:3.

In the mask image of 321×181, an element of the target in a rectangular frame may be set to be 1, and to be 0 otherwise. To include the background information, the rectangular frame used may be larger than an actual rectangular frame corresponding to the target. The size of the rectangular frame and how much is it larger than the actual rectangular frame corresponding to the target may be set based on a circumstance. Based on the ratio 1:3, a size of an actual block and a size of the rectangular frame used may be set. Herein, when the target is relatively large, the size of the rectangular frame may exceed the range of 321×181, and such an excessive portion may be directly cropped. The rectangular frame may be a detection frame used to crop an image block.

The processor 130 splices the image block of the 321×181 size and the mask image corresponding to the image block, and inputs a spliced image obtained through the splicing to a single-task network. In an example, a mask indicates or sets a target region in an RGB image. Thus, the RGB image and the mask image may be spliced or stitched, and a spliced image obtained through the splicing or the stitching may be input.

In operation 350, the processor 130 extracts a feature of the input image through the single-task network and estimates a probability that the target corresponds to or belongs to each class.

In operation 360, the processor 130 obtains a final depth of the target by assigning a weighted value to the probability output through the single-task network.

For example, the single-task network may be a convolutional neural network (CNN)-based network. The single-task network may be of an improved visual geometry group (VGG) 16 network structure. A detailed network structure is indicated in Table 1 below.

TABLE 1

| Network layer | Conv1 | Conv2 | Conv3 | Conv4 | Fc1 | Fc2 | Fc3 |
|---|---|---|---|---|---|---|---|
| Existing VGG16 network | 3 × 3 × 64 | 3 × 3 × 128 | 3 × 3 × 256 | 3 × 3 × 512 | 4096 | 4096 | 1000 |
| Improved VGG16 network | 3 × 3 × 32 | 3 × 3 × 32 | 3 × 3 × 64 | 3 × 3 × 64 | 128 | 64 | 8 |

Referring to Table 1, Conv indicates a convolution layer, and Fc indicates a fully connected layer. For example, in a "3×3×64" parameter, 3×3 indicates a kernel size and 64 indicates the number of channels.

A probability that a target output from the single-task network, or the improved VGG16 network, belongs to a class k may be defined as $p_k$, k=0, 1, ..., 7. In an example, the single-task network is trained through a stochastic gradient descent (SGD) algorithm.

A depth d, for example, a final depth, of the target may be obtained by assigning a weighted value to the probability. For example, the depth d may be obtained using Equation 1.

$$d = \sum_{k=0}^{7} p_k d_k \qquad \text{[Equation 1]}$$

In Equation 1, $d_k$ denotes a weighted value, which is defined as $d_k=(k+1)\times 10$, and indicates a depth interval corresponding to the class k, for example, an average depth in a kth depth interval. For example, the average depth may also indicate a median depth.

Figure 4A:
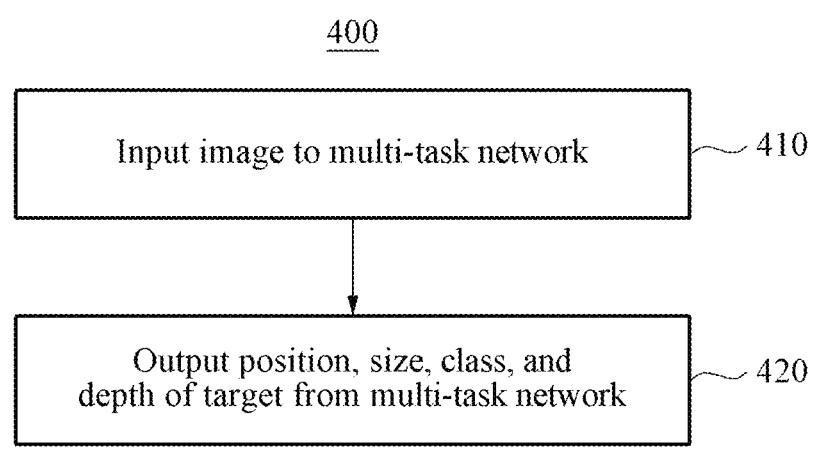
FIG. 4A is a diagram illustrating another example of a target depth estimation method.

FIG. 4A is a diagram illustrating another example of a target depth estimation method 400. The operations in FIG. 4A may be performed in the sequence and manner as shown, although the order of some operations may be changed or some of the operations omitted without departing from the spirit and scope of the illustrative examples described. Many of the operations shown in FIG. 4A may be performed in parallel or concurrently. One or more blocks of FIG. 4A, and combinations of the blocks, can be implemented by special purpose hardware-based computer that perform the specified functions, or combinations of special purpose hardware and computer instructions. In addition to the description of FIG. 4A below, the descriptions of FIGS. 1-3B are also applicable to FIG. 4A, and are incorporated herein by reference. Thus, the above description may not be repeated here.

In a case in which a position, a size, and a class of a target are not known, the processor 130 may estimate a depth of the target through multi-task learning of a multi-task network.

Referring to FIG. 4A, in operation 410, when a position, a size, and a class of a target in an input image is not known, the processor 130 inputs the input image to the multi-task network.

In operation 420, the processor 130 estimates the position, the size, and the class of the target, and a depth of the target, using the multi-task network, and outputs the position, the size, the class, and the depth of the target from the multi-task network.

Herein, the position of the target indicates coordinates of the target in the input image, and the size of the target is a size of a detection frame, for example, a rectangular frame, surrounding the target.

For example, the multi-task network may be of a network structure based on a feature of a faster region-based CNN (R-CNN).

Figure 4B:
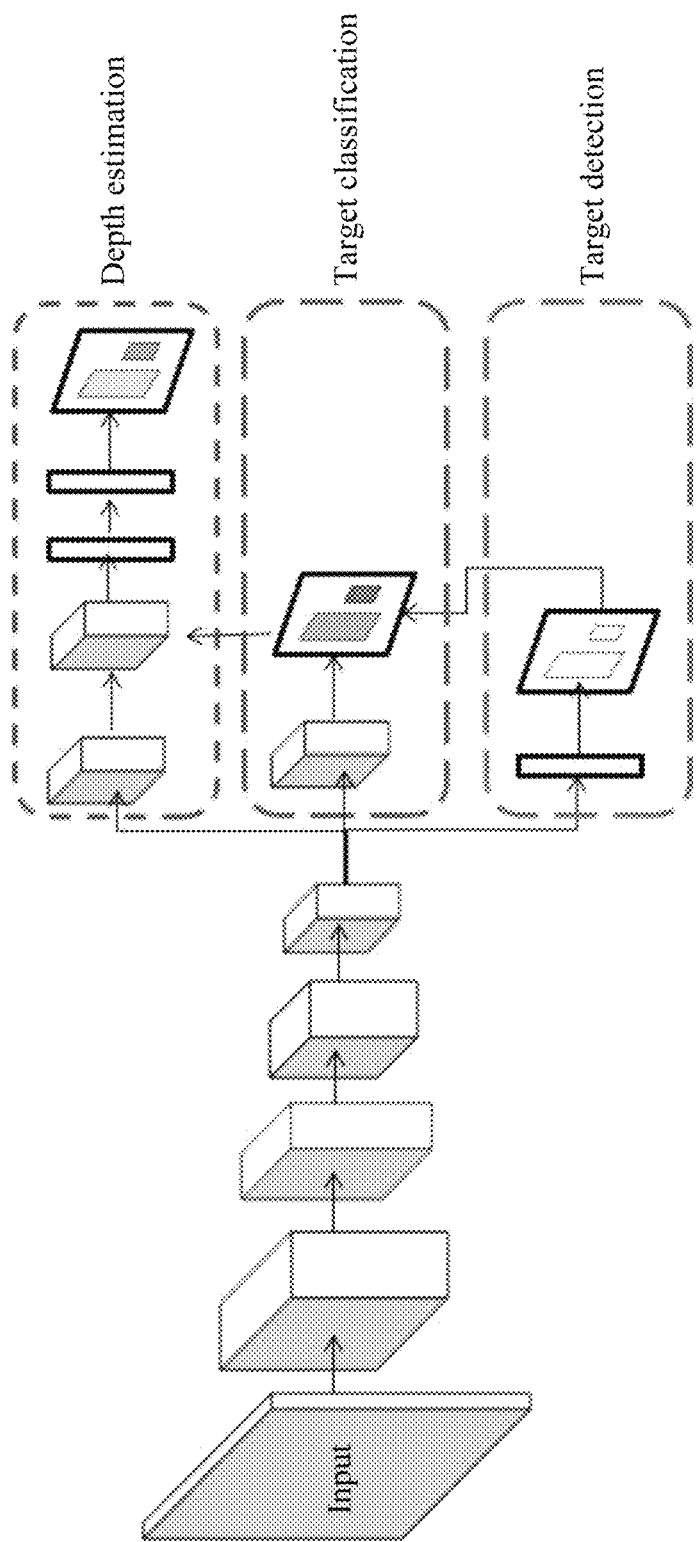
FIG. 4B is a diagram illustrating an example of the target depth estimation method of FIG. 4A.

FIG. 4B is a diagram illustrating an example of the target depth estimation method 400 of FIG. 4A.

FIG. 4B illustrates an example of the target depth estimation method 400 used when a state of a target is not known.

When a position, a size, and a class of a target in an image are not known, the processor 130 may input the image to a multi-task network to output a result of estimating the position, the size, the class, and a depth of the target.

Referring to FIG. 4B, when an image is input, a convolution operation and a corresponding pooling operation may be performed through a plurality of layers to obtain features to be shared.

An image obtained through the convolution operation and the pooling operation may be input to three branches: a target detection branch, a target classification branch, and a target depth estimation branch. The processing of the image in the target detection branch processing, target classification branch processing, and target depth estimation branch processing may be performed in the respective branches.

The position and the size of the target may be determined through the target detection branch processing. In an example, the size of the target may be, for example, a size of a detection frame surrounding the target. The position and the size of the target may be input to the target classification branch. The class of the target may be determined through the target classification branch processing based on the position and the size of the target. The position, the size, and the class of the target may be input to the target depth estimation branch. The depth of the target may be determined through the target depth estimation branch processing based on the position, the size, and the class of the target.

When estimating the depth of the target through such a method described above, target position (or region) and target class information may be provided through the target detection branch processing and the target classification branch processing. A candidate for the target may be provided through sliding window or region proposal. As in a faster R-CNN, a plurality of anchors may be defined through the sliding window or the region proposal. That is, one anchor may be defined at each position, and a result corresponding to a most suitable anchor may be selected and output.

A loss function of the multi-task network may be obtained by adding depth loss information to a loss function of the faster R-CNN. The loss function of the multi-task network may be defined as represented by Equation 2.

$$L(\{p_i\}, \{t_i\}) = \frac{1}{N_{cls}} \sum_i L_{cls}(p_i, p_i^*) + \lambda_1 \frac{1}{N_{reg}} \sum_i p_i^* L_{reg}(t_i, t_i^*) + \lambda_2 \frac{1}{N_{depth}} \sum_i p_i^* L_{depth}(d_i, d_i^*)$$ [Equation 2]

In Equation 2, $$\frac{1}{N_{cls}} \sum_i L_{cls}(p_i, p_i^*)$$

denotes an object classification loss function, $$\lambda_1 \frac{1}{N_{reg}} \sum_i p_i^* L_{depth}(t_i, t_i^*)$$

denotes a detection frame regression loss function, and $$\lambda_2 \frac{1}{N_{depth}} \sum_i p_i^* L_{depth}(d_i, d_i^*)$$

denotes a depth estimation loss function.

In Equation 2, i denotes a serial number of an anchor in a mini-batch, and $p_i$ denotes an i-th anchor prediction class or label, $t_i$ denotes a detection frame or a bounding box of four parameterized coordinates, and $d_i$ denotes an estimated or predicted depth.

In Equation 2, $L_{cls}$ and $L_{depth}$ denote a loss function of multinomial logistic regression (softmax log), and $L_{reg}$ denotes an L1 smoothing loss function.

In Equation 2, $p^*_i$ indicates following a GT, which is a manually labeled data and actual measurement data, or a correct answer, that is input to train a network. A current anchor may be a positive anchor. In Equation 2, $t^*_i$ denotes a detection frame, or a bounding box, of the GT, and $d^*_i$ denotes a depth of the GT.

In Equation 2, $N_{cls}$, $N_{reg}$, and $N_{depth}$ are a normalization term, and $\lambda_1$ and $\lambda_2$ are a weighted term of loss.

In an example, the network may be trained through an Stochastic gradient descent (SGD)_algorithm.

In an example, a detailed loss function is discovered in the faster R-CNN.

The network may output position, size, class, and depth information of a target. A greater number of candidates for the target may be obtained based on the faster R-CNN. In addition, a degree of confidence, a detection frame, and a depth of classification may be output simultaneously for each candidate through forward propagation of the network. Further, filtering may be performed on candidates corresponding to the target based on non-maximum suppression (NMS) and a confidence threshold of classification. For a candidate, for example, one that is left after the filtering, corresponding class, detection frame, and depth information may be directly output. The depth information of the target may correspond to an optimal depth interval, for example, a depth interval with a greatest probability, and may be obtained by assigning a weighted value to a probability that the target belongs to a class as represented by Equation 1 above.

In another example, the multi-task network may be of a network structure based on a second version of You Only Look Once (YOLO2). A detailed network structure is indicated in Table 2 below.

TABLE 2

| Type | Number of layers in network | Convolution kernel size/ step size | Output |
|---|---|---|---|
| Convolution | 16 | 3 × 3 | 500 × 151 |
| Maxpooling | | 2 × 2/2 | 250 × 76 |
| Convolution | 16 | 3 × 3 | 250 × 76 |
| Maxpooling | | 2 × 2/2 | 125 × 38 |
| Convolution | 32 | 3 × 3 | 125 × 38 |
| Maxpooling | | 2 × 2/2 | 63 × 19 |
| Convolution | 32 | 3 × 3 | 63 × 19 |
| Maxpooling | | 2 × 2/2 | 32 × 10 |
| Convolution | 64 | 3 × 3 | 32 × 10 |
| Convolution | 64 | 3 × 3 | 32 × 10 |
| Convolution | 128 | 3 × 3 | 32 × 10 |
| Convolution | 80 | 1 × 1 | 32 × 10 |

An anchor may also be used in the YOLO2. When an image is input, a convolution operation and a pooling operation may be performed, and a final convolution layer may be obtained. A dimension of the final convolution layer may be w×h×s, in which w and h denote a reduced width and a reduced height, respectively, and s may correspond to a vector. The image may be divided into a plurality of cells, for example, squares, grids, pixels, and lattices. Each cell in the final convolution layer may include information about a plurality of anchors. When $R_i$ denotes a detection frame, or a bounding box, an i-th anchor, $P_i$ denotes a probability of the i-th anchor being each class, and $D_i$ denotes a depth of the i-th anchor, a vector of each cell may be represented as $[R_1, \ldots, R_K, P_1, \ldots, P_K, D_1, \ldots, D_K]$.

A loss function of the multi-task network may be obtained by adding depth loss information to a loss function of the YOLO2. The loss function of the multi-task network may be defined as represented by Equation 3.

$$L = \lambda_{coord} \sum_{i=1}^{n} \sum_{j=1}^{B} I_{ij}^{obj} [(b_{xi} - \hat{x}_i)^2 + (b_{yi} - \hat{y}_i)^2] + \lambda_{coord} \sum_{i=1}^{n} \sum_{j=1}^{B} I_{ij}^{obj} \left[ \left(\sqrt{b_{wi}} - \sqrt{\hat{w}_i}\right)^2 + \left(\sqrt{b_{hi}} - \sqrt{\hat{h}_i}\right)^2 \right] +$$

[Equation 3]

-continued $$\sum_{i=1}^{n} \sum_{j=1}^{B} \sum_{c \in classes} (p_{ij}(c) - \hat{p}_{ij}(c))^2 + \sum_{i=1}^{n} \sum_{j=1}^{B} I_{ij}^{obj} (d_{ij} - \hat{d}_{ij})^2$$

In Equation 3, $$\lambda_{coord} \sum_{i=1}^{n} \sum_{j=1}^{B} I_{ij}^{obj} [(b_{xi} - \hat{x}_i)^2 + (b_{yi} - \hat{y}_i)^2] + \lambda_{coord} \sum_{i=1}^{n} \sum_{j=1}^{B} I_{ij}^{obj} \left[ \left(\sqrt{b_{wi}} - \sqrt{\hat{w}_i}\right)^2 + \left(\sqrt{b_{hi}} - \sqrt{\hat{h}_i}\right)^2 \right]$$

denotes a detection frame regression loss function, $$\sum_{i=1}^{n} \sum_{j=1}^{B} \sum_{c \in classes} (p_{ij}(c) - \hat{p}_{ij}(c))^2$$

denotes an object classification loss function, and $$\sum_{i=1}^{n} \sum_{j=1}^{B} I_{ij}^{obj} (d_{ij} - \hat{d}_{ij})^2$$

denotes a depth estimation loss function. In Equation 3, where $\lambda_{coord}$ denotes a weighted value for loss when a difference between a coordinate of an object and a coordinate of a GT is used as the loss, n denotes each cell of the final convolution layer, for example, width×height, and B denotes the number of anchors.

In Equation 3, $I_{ij}^{obj}$ indicates whether an object is present in a j-th anchor of an i-th cell, which is indicated as "1" when the object is present and "0" when the object is not present.

In Equation 3, $\hat{x}_i$ and $\hat{y}_i$ denote an x coordinate of the GT and a y coordinate of the GT, respectively. $\hat{W}_i$ and $\hat{h}_i$ denote a width w of the GT and a height h of the GT, respectively.

In Equation 3, $b_{xi}$, $b_{yi}$, $b_{wi}$, and $b_{hi}$ may be an actual detection frame or bounding box of a current anchor.

In Equation 3, $p_{ij}(c)$ denotes a probability of the current anchor belonging to a c class, and $d_{ij}$ denotes a depth of a target corresponding to the current anchor. In Equation 3, $\hat{p}_{ij}(c)$ denotes a probability, for example, a GT value, indicating whether an object of the c class is present in the j-th anchor in the i-th cell. In Equation 3, $\hat{d}_{ij}$ denotes a depth, for example, a GT value, of the object of the j-th anchor in the i-th cell.

In addition, "classes" indicate a set of classes, and $$\sum_{c \in classes}$$

denotes a sum of calculated values of the classes.

A detailed loss function, or a loss function parameter, may be discovered in YOLO.

For example, when a target is present in a cell, a detection frame or a bounding box may maximally approximate an actual frame through a loss function, an overlapping ratio between the detection frame and a GT frame may be maximally close, and an estimated depth of the target may approximate an actual depth. However, when a target is not present in a cell, a probability of the target being detected in the cell may be minimized through the loss function. The multi-task network may be trained through an SGB algorithm. A loss function of each term in Equations 2 and 3 may not be limited to a form described above, and may be at least one of squared error, cross entropy, or multinomial logistic regression (or logarithm multinomial logistic regression, for example, softmax log).

When a single image is input, a target or an object in the image may be detected and classified based on a single layer feature, and a depth of the target may be estimated. When a final single convolution layer is obtained, it may be possible to determine whether the target is present in a cell based on a probability of the target belonging to a class, and determine which class the target belongs to. When the target is determined to be present in the cell, a detection frame of the target may be obtained based on a corresponding anchor, and a depth corresponding to the detection frame may be obtained simultaneously. Final depth information of the target may correspond to an optimal depth interval of the target, for example, an interval with a greatest probability, or may be obtained by assigning a weighted value to the probability of the target belonging to a class based on Equation 1 above.

Figure 5:
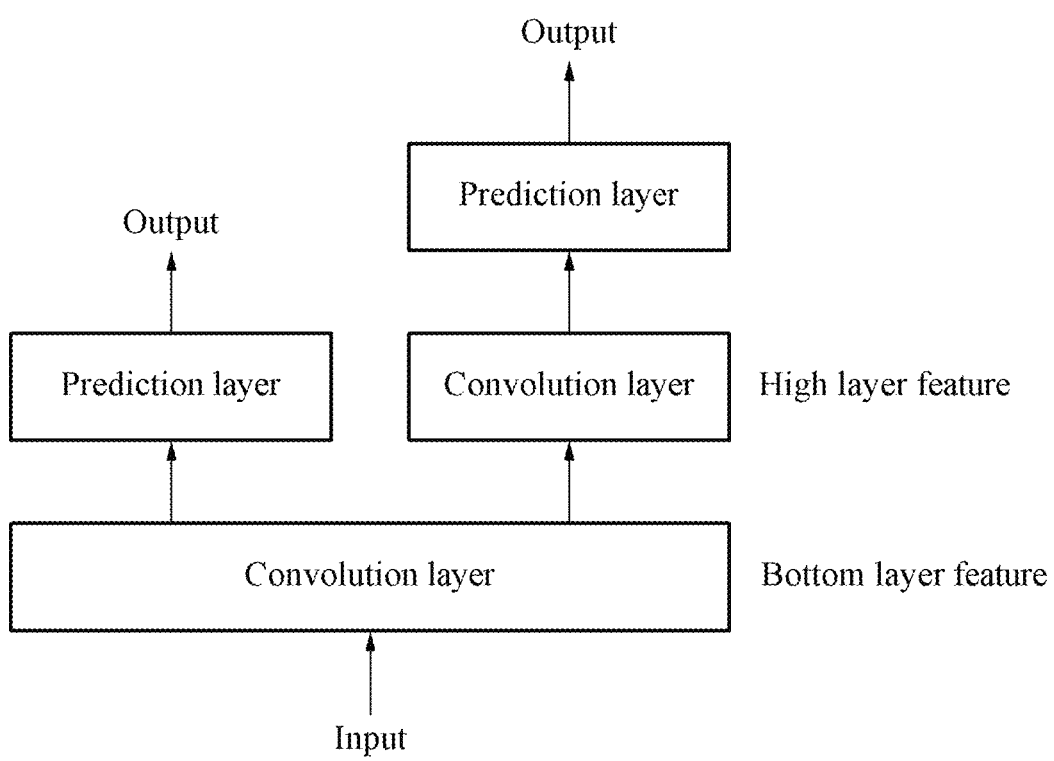
FIGS. 5 and 6 are diagrams illustrating examples of a network structure for multiple scale processing.
Figure 6:
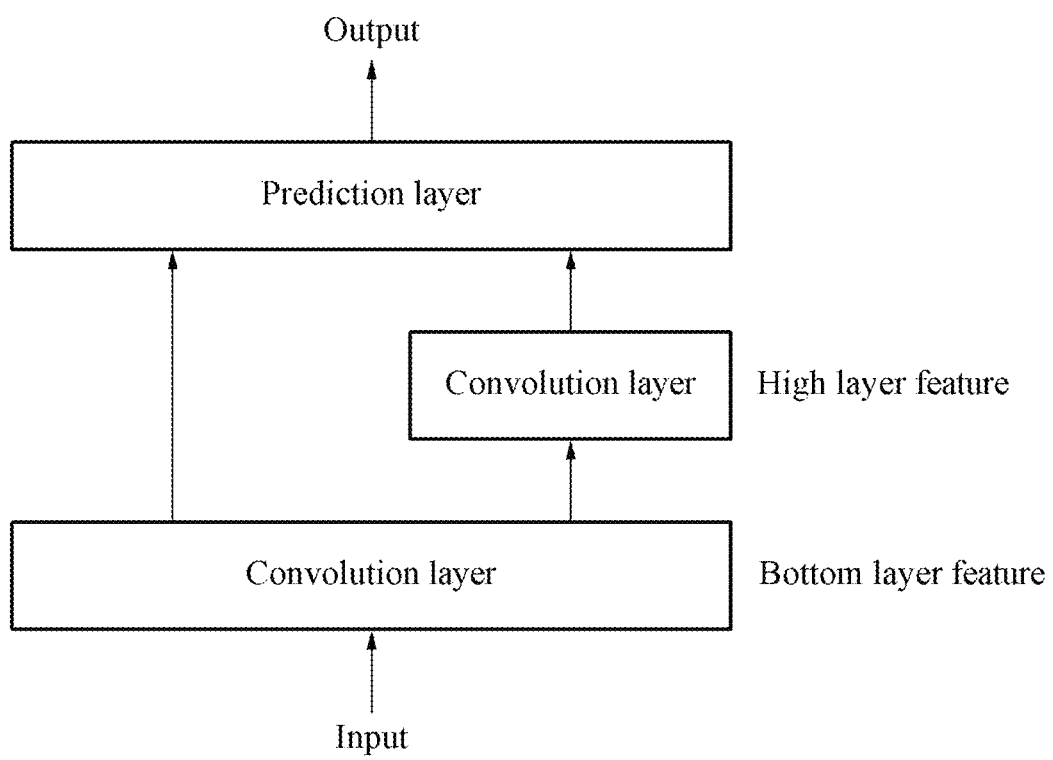

FIGS. 5 and 6 are diagrams illustrating examples of a network structure for multiple scale processing.

For multiple scale processing, for example, sampling a single image to obtain images of different sizes, target detection and classification, and target depth estimation may be processed as in a single shot multibox detector (SSD) based on features of multiple layers. Such feature layers of different scales may be connected to different prediction layers, and a same prediction layer.

FIGS. 5 and 6 illustrate a case in which a plurality of feature layers, for example, convolution layers, is connected to different prediction layers based on a YOLO2 network frame, and a case in which the feature layers are connected to a same prediction layer based on a YOLO2 network frame, respectively.

Referring to FIG. 5, in the feature layers respectively connected to the different prediction layers, classification, detection, and depth estimation may be performed.

Referring to FIG. 6, two feature layers are connected to a same prediction layer. That is, parameters of the prediction layer may be shared. However, to obtain calculation results for a target of different scales, features of different layers may be additionally estimated or predicted. With respect to a detection frame obtained from each of the different feature layers, a final result may be obtained based on a confidence value of a class and non-maximum suppression (NMS).

The image processing device 10, image processing apparatus 100, receiver 110, and other apparatuses, units, modules, devices, and other components described herein with respect to FIGS. 1, 5, and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3A, 3B, 4A, 4B, 5, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
   receiving an input image; and
   estimating a depth of a target based on a position, a size, and a class of the target in the input image, wherein the estimating comprises:
   estimating the depth of the target through single-task learning of a single-task neural network, in response to the position, the size, and the class of the target being known; and
   estimating the depth of the target through multi-task learning of a multi-task neural network, in response to the position, the size, and the class of the target not being known.

2. The image processing method of claim 1, further comprising:
   preprocessing the input image before estimating the depth of the target.

3. The image processing method of claim 2, wherein the preprocessing comprises:
   normalizing the input image based on focal length information of the input image and standard focal length information.

4. The image processing method of claim 1, wherein the estimating of the depth of the target through the single-task learning comprises:
   cropping an image block around the target from the input image, and masking the image block to obtain a mask image of a size that is similar to a size of the image block;
   splicing the image block and the mask image for each channel;
   inputting, to the single-task neural network, a spliced image obtained through the splicing; and
   outputting the depth of the target from the single-task neural network.

5. The image processing method of claim 4, wherein the outputting of the depth of the target from the single-task neural network comprises:
   determining a probability that the depth of the target corresponds to each depth interval;
   obtaining a final depth of the target by assigning a weighted value to the probability of the each depth interval; and
   outputting the final depth of the target.

6. The image processing method of claim 1, wherein the estimating of the depth of the target through the multi-task learning comprises:
   determining the position and the size of the target through target detection branch processing;
   determining the class of the target through target classification branch processing based on the position and the size of the target; and determining the depth of the target through target depth estimation branch processing based on the position, the size, and the class of the target.

7. The image processing method of claim 6, wherein the multi-task neural network is a network based on a feature of a region-based convolutional neural network (R-CNN),
wherein a loss function of the multi-task network is obtained by adding depth loss information to a loss function of the R-CNN.

8. The image processing method of claim 6, wherein the multi-task neural network is a network based on a second version of You Only Look Once (YOLO2),
wherein a loss function of the multi-task neural network is obtained by adding depth loss information to a loss function of the YOLO2.

9. The image processing method of claim 6, wherein the determining of the depth of the target through the target depth estimation branch processing comprises:
determining a probability that the depth of the target corresponds to each depth interval; and
obtaining a final depth of the target by assigning a weighted value to the respective probability for the each depth interval.

10. An image processing apparatus comprising:
a processor configured to:
receive an input image; and
estimate a depth of a target based on a position, a size, and a class of the target in the input image,
wherein the processor is further configured to:
estimate the depth of the target through single-task learning of a single-task neural network, in response to the position, the size, and the class of the target being known; and
estimate the depth of the target through multi-task learning of a multi-task neural network, in response to the position, the size, and the class of the target not being known.

11. The image processing apparatus of claim 10, wherein the processor is further configured to:
preprocess the input image before estimating the depth of the target.

12. The image processing apparatus of claim 11, wherein the processor is further configured to:
normalize the input image based on focal length information of the input image and standard focal length information.

13. The image processing apparatus of claim 10, wherein, for the estimating of the depth of the target through the single-task learning, the processor is further configured to:
crop an image block around the target from the input image;
mask the image block to obtain a mask image of a size that is similar to a size of the image block;
splice the image block and the mask image for each channel;
input, to the single-task neural network, a spliced image obtained through the splicing; and
output the depth of the target from the single-task neural network.

14. The image processing apparatus of claim 13, wherein the processor is further configured to:
determine a probability that the depth of the target corresponds to each depth interval;
obtain a final depth of the target by assigning a weighted value to the probability of the each depth interval; and
output the final depth of the target.

15. The image processing apparatus of claim 10, wherein, for the estimating of the depth of the target through the multi-task learning, the processor is further configured to:
determine the position and the size of the target through target detection branch processing;
determine the class of the target through target classification branch processing based on the position and the size of the target; and
determine the depth of the target through target depth estimation branch processing based on the position, the size, and the class of the target.

16. The image processing apparatus of claim 15, wherein the multi-task neural network is a network based on a feature of a region-based convolutional neural network (R-CNN),
wherein a loss function of the multi-task neural network is obtained by adding depth loss information to a loss function of the R-CNN.

17. The image processing apparatus of claim 15, wherein the multi-task neural network is a network based on a second version of You Only Look Once (YOLO2),
wherein a loss function of the multi-task neural network is obtained by adding depth loss information to a loss function of the YOLO2.

18. The image processing apparatus of claim 15, wherein the processor is further configured to:
determine a probability that the depth of the target corresponds to each depth interval; and
obtain a final depth of the target by assigning a weighted value of the respective probability for the each depth interval.

* * * * *